United States Patent [19]

Latsch et al.

[11] Patent Number: 4,523,559
[45] Date of Patent: Jun. 18, 1985

[54] INTERNAL COMBUSTION ENGINE

[75] Inventors: Reinhard Latsch, Vaihingen; Ernst Linder, Mühlacker; Winfried Moser, Ludwigsburg, all of Fed. Rep. of Germany

[73] Assignee: Robert Bosch GmbH, Stuttgart, Fed. Rep. of Germany

[21] Appl. No.: 628,054

[22] Filed: Jul. 5, 1984

[30] Foreign Application Priority Data

Aug. 30, 1983 [DE] Fed. Rep. of Germany ....... 3331115

[51] Int. Cl.$^3$ .............................................. F02B 31/00
[52] U.S. Cl. .................................. 123/306; 123/188 M
[58] Field of Search ................ 123/306, 188 M, 52 M

[56] References Cited

U.S. PATENT DOCUMENTS

| 3,029,799 | 4/1962 | May | 123/306 |
| 3,911,873 | 10/1975 | Dave | 123/306 |
| 4,207,854 | 6/1980 | Alford | 123/306 |
| 4,320,725 | 3/1982 | Rychlik | 123/306 |
| 4,467,749 | 8/1984 | Macda | 123/306 |

FOREIGN PATENT DOCUMENTS 57-49019  3/1982  Japan .................................. 123/306

Primary Examiner—Ronald B. Cox
Attorney, Agent, or Firm—Edwin E. Greigg

[57] ABSTRACT

The internal combustion engine has at least one combustion chamber, an inlet conduit leading to it, and an adjustable means for varying flows of a medium, such as air or a fuel-air mixture, flowing into the combustion chamber for the sake of an optimized acceleration of curves defined by the process of combustion, so that economical engine operation is attained while producing as little in the way of toxic exhaust gas components as possible. An adjusting motor acting upon the means is controlled by a regulator, which is connected via a comparator with a set-point value transducer and an actual-value transducer. The actual-value transducer includes an optoelectric sensor connected to the combustion chamber for measuring the curves of combustion. The set-point value transducer indicates a set-point value for optimal curves of combustion, and the regulator, via the adjustable means, reduces any difference that may exist between the set-point value and the actual value.

13 Claims, 5 Drawing Figures

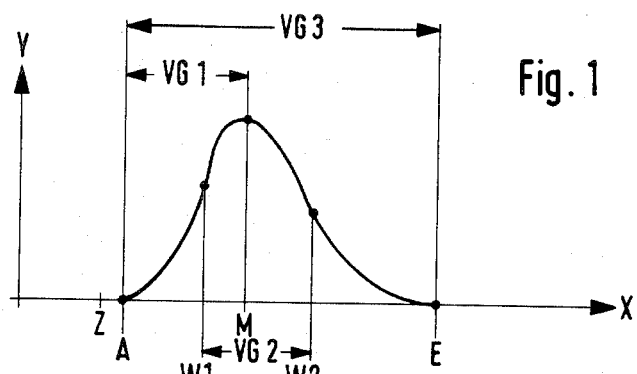
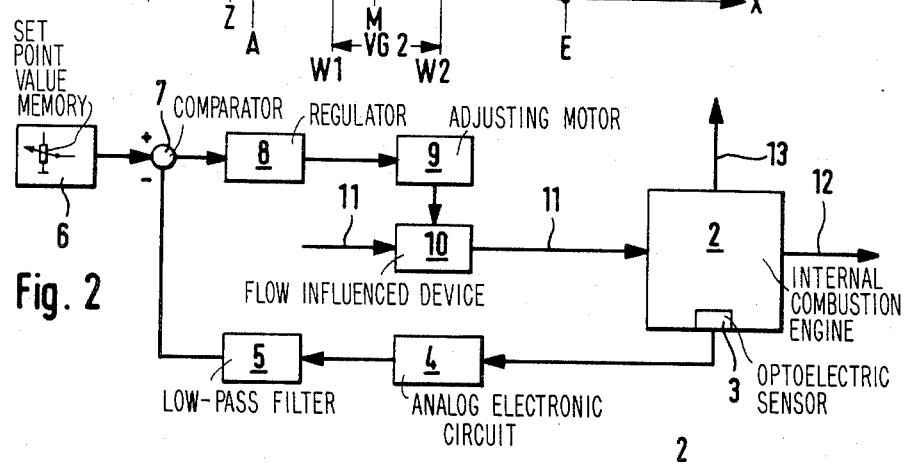
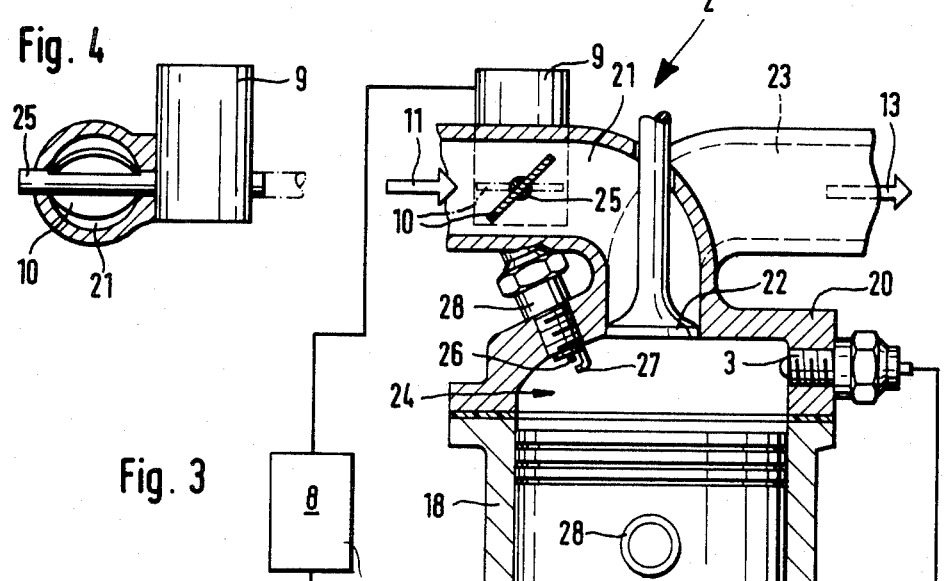
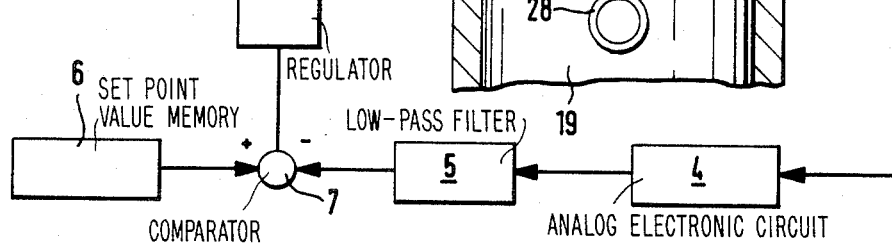

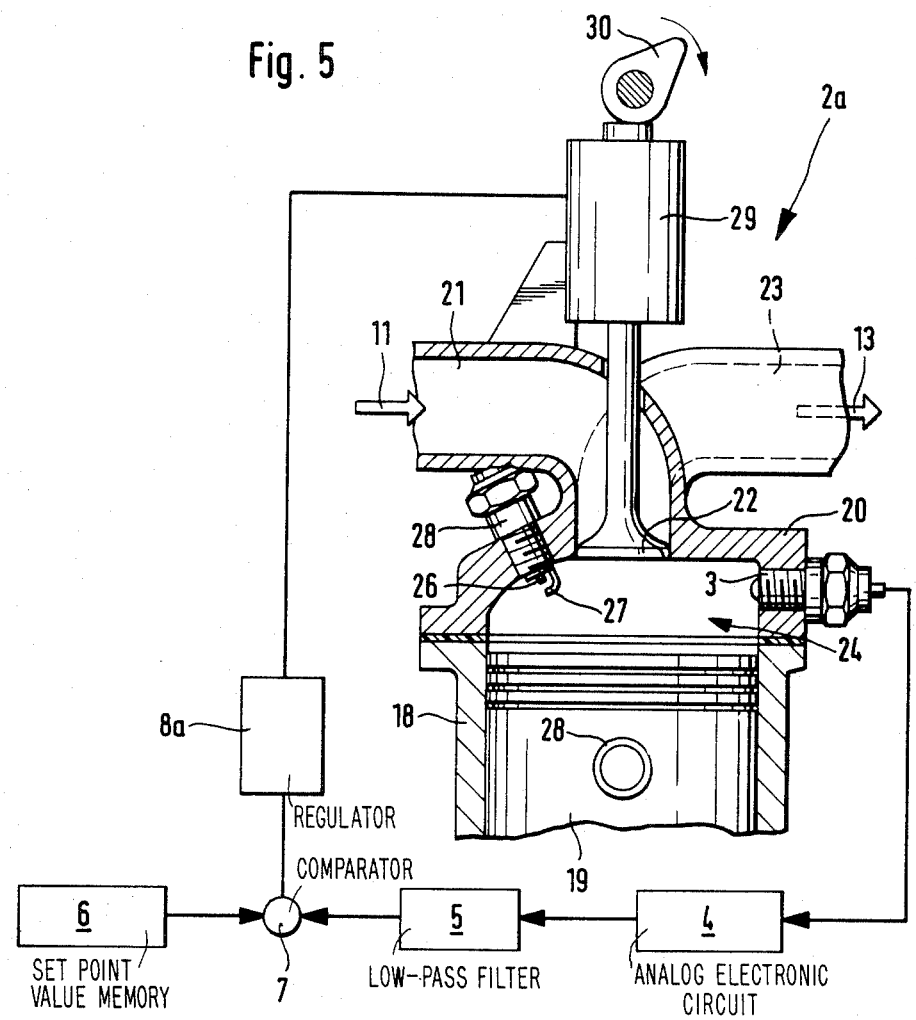

INTERNAL COMBUSTION ENGINE

BACKGROUND OF THE INVENTION

The invention is based on an internal combustion engine as generally defined hereinafter. It is known (European Pat. No. 0071179 A2, European Pat. No. 0071272 A2) for bypass conduits having adjustable slides to be associated with the spirally extending inlet conduits leading to combustion chambers in internal combustion engines, with the flows in the combustion chambers being variable via the adjustable slides. At low load and/or low rpm, the slides are at least partially closed, so that the inlet conduits, which terminate in a spiral, generate high spin in the combustion chambers as they are being filled, thereby accelerating the courses of combustion. At full load and/or low rpm the slides are opened wide, so that the spin is relatively low and the combustions cannot elapse so rapidly. Adjustment is effected by a slide position regulator, which is connected both to a set-point value transducer operating in accordance with operating parameters such as rpm and pressure in the inlet conduits and to an actual-value transducer coupled with the slide and measuring the orientation of the slide. However, optimal combustion courses come about only when parameters such as the dimensions of the inlet conduits of the engine and of the slides, engine and air temperature, humidity and the ignitability of the fuels agree precisely with the initial parameters upon which the ascertainment of optimal set-point values is based. Otherwise the engines operate at a higher level of fuel consumption and with increased wear, and more toxic exhaust gas components are produced.

In another known internal combustion engine (U.S. Pat. No. 4,285,310), two inlet conduits provided with inlet valves discharge into one combustion chamber. One of the inlet valves has a stroke drive means that is controlled by the vacuum in the inlet conduit. Different opening strokes are effected at the inlet valve depending on the magnitude of the vacuum. A change in the opening strokes results in different kinds of turbulence in the combustion chamber. The production of turbulence is promoted at low engine load, in order to accelerate the combustion processes or events. In this engine as well, differences in manufacture, aging of the system, fluctuations in environmental conditions, the properties of the fuel and mismatches of various fuels result in disadvantageous deviations from the most favorable turbulence in a particular case.

OBJECT AND SUMMARY OF THE INVENTION

The internal combustion engine as defined hereinafter has the advantage that instead of the position of the means controlling the flows, it is the courses of combustion that are affected by these flows, as well as by the disruptive influences described above, such as varying fuel properties, that are measured and adapted to set-point values. The properties of the fuel, in particular, are very difficult to measure, but the invention described hereinafter avoids this difficulty.

The principles of the invention also provide alternative solutions for measuring the events or phenomena in the combustion chamber that define the combustion curves. According to the invention there is disclosed the particular evaluation means for supplying actual values to the regulator that is advantageous for the above-mentioned solutions.

According to one embodiment of the invention there is disclosed a technologically simple means for influencing the flow which can easily be incorporated in the engine. Still a further embodiment has the advantage that no flow-impeding means at all are incorporated into the inlet conduit, and accordingly the engine is capable of producing high power.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 is a diagram showing a curve of combustion as it is measurable by means of an optoelectric sensor;

FIG. 2 is a signal flow diagram for the internal combustion engine according to the invention;

FIG. 3 shows a first exemplary embodiment of the internal combustion engine according to the invention in partial cross section;

FIG. 4 shows a detail of the engine according to FIG. 3; and

FIG. 5 shows a second exemplary embodiment of the internal combustion engine according to the invention in partial cross section.

DESCRIPTION OF THE PREFERRED EMBODIMENTS

In the diagram shown in FIG. 1, the abscissa X indicates the crankshaft angle of the internal combustion engine according to the invention. The occasions of brightness occurring during the course of one combustion event inside the engine are shown qualitatively over the crankshaft angle on the ordinate Y of the diagram. After an ignition of a combustible mixture of air and fuel, which takes place at Z, a certain period of time elapses until, as a result of a first flame propagation, a brightness of such intensity arises that it can be reliably measured by known means. The ignition at Z can be performed, by way of example, by means of high-voltage ignition electrodes. The phenomenon of the occurrence of the measurable brightness is indicated on the abscissa at A. Subsequently the brightness increases with increasing rapidity up to a point W1 and thereafter increases more slowly up to a maximum M. From then on, the brightness decreases, at first faster and faster, up to a point W2, and then slower and slower. Finally, at point E, there is no further measurable brightness. The points W1 and W2 represent turning points in the course of the brightness. The course of the brightness provides a fairly accurate image of the course of the combustion, and of the combustion speed as well, if the rotational angle through which the crankshaft has passed during this time is also taken into consideration.

In engine operation which is optimized in terms of fuel consumption and/or exhaust gas properties and engine smoothness, the combustions or phases of combustion take place within crankshaft angles that are ascertained for instance by means of a test engine. The points at A, W1, M, W2 and also E coincide with specific crankshaft angles which are typical for the selected engine. In general, the combustion chambers and inlet systems of internal combustion engines are designed such that combustions take place with the maximum possible rapidity. The limit here is set, in engines without any special auxiliary equipment, by full-load operation, where overly rapid combustions could result in knocking, reduced efficiency because of increased heat losses at the walls, and increased proportions of nitrous oxides in the exhaust gas. On the other hand, the combustions should take place considerably more rapidly in partial-load operation, in order to attain optimal operating efficiency. A known means of avoiding the disadvantages associated with slow combustions is to amplify the movements of the charge inside the engine by means of controlled auxiliary equipment, or to increase the speeds of these movements (European Pat. No. 0071179 A2, U.S. Pat. No. 4,285,310). The movements of the charge in the engine that determine the flame propagation are brought about, for instance, by the flow phenomena in the inlet conduit and in the inlet valve, or by so-called squish edges between the piston and the cylinder head of the combustion chamber. Slides or the like associated with the inlet conduit of the engine, or adjustable blocking means or inlet valves, which are actuated by drive means with a variable stroke height, serve as means for further acceleration.

As already mentioned above, in the internal combustion engine according to the invention the combustions are regulated. The basic design of the engine according to the invention will be best understood in conjunction with the signal flow diagram of FIG. 2. The occasions of brightness in combustion curves within the internal combustion engine 2 are measured by means of an optoelectric sensor 3 and amplified inside a subsequent electronic circuit 4, which may include a pulse shaping circuit and a differentiating circuit of known design depending on the type of sensor used, and monitored as to whether a threshold has been exceeded or not attained by a suitable threshold switch, as a result of which points A and E of FIG. 1 become recognizable. Furthermore, in an analogous manner, from the location of points A and E relative to the angle of a crankshaft of the engine, it is ascertained how large the rotational angle VG3 of the crankshaft between these two points is. This calculated value is supplied in analog form, as a voltage, to a low-pass filter 5 by the electronic circuit 4. This low-pass filter 5 smooths out voltage fluctuations, which inevitably occur because of statistically occurring irregularities from one course of combustion to another. The smoothed voltage indicates an averaged actual value, which should agree as well as possible with a set-point or reference value from a set-point value memory 6. The actual value and the set-point value are compared in a comparator 7 connected to the low-pass filter 5 and the set-point value transducer 6. Any difference between these values is supplied to a regulator 8. In accordance with its transmission function which is dependent on its internal makeup, the regulator 8 generates proportional or integral or differential adjusting signals, or combinations thereof, which are delivered to a subsequent adjusting motor. This adjusting motor 9 adjusts a flow-influenced device 10 in the engine 2. Exemplary embodiments of such a device are described in detail below. As a consequence of the adjustment of this device 10, air or a fuel-air mixture is introduced into the engine 2 with varying intensity or in a varying direction, so that the curves of combustion take place in a varied manner inside this engine. In the event that it is only the flow of air that is affected by the device 10, then the fuel required for combustion must be supplied between this device 10 and a combustion chamber of the engine, or directly into the combustion chamber. The sensor 3 observes varied combustion curves, and the comparator 7 monitors the success of the adjustment. As the occasion may require, the comparator reports any new control deviation to the regulator 8, which in turn then effects an approximation of actual values to the set-point value. The engine 2 produces a torque 12, which as a result of the regulation is generated in a fuel-saving manner. The engine 2 emits exhaust gas 13, which because of prespecifying of the set-point value contains a low proportion of undesirable components such as nitrous oxides. It should additionally be noted that to realize the stated goals of high efficiency on the one hand and an exhaust gas low in toxic substances on the other, it is advantageous for the set-point value transducer to emit variable set-point values at specific operating states of the engine 2, such as low load, high load for a long period, or temporarily high load for instance in order to accelerate a motor vehicle.

Instead of the set-point value memory 6, which in accordance with the analog electronic circuit 4 likewise functions in analog fashion, a set-point value memory which is designed to emit digital set-point values can naturally also be used. These set-point values can be stored, in accordance with the prior art, in the form of parameter-dependent lists of set-point values or in the form of rules of calculation. In that case, the embodiment of the comparator 7 as well as at least the output portion of the electronic circuit 4 would then have to be adapted to the set-point value transducer embodied in such a way. The engine according to the invention may also, however, have a pressure measuring sensor, instead of the optoelectric sensor 3. By means of this pressure measuring sensor, the actual value could be ascertained in a similar manner, using the electronic circuit 4 and the low-pass filter 5. A further possible modification would be the replacement of the optoelectric sensor 3 with one or more ion current sensors protruding into the engine 2. Depending on how this at least one ion current sensor is disposed and oriented, phenomena inside the engine which coincide with the phenomena at A and E shown in FIG. 1 can be ascertained. The evaluation of measurement signals can then be performed, for instance again by means of the electronic circuit 4. In the case where ion current sensors are used, if the phenomena measurable with these sensors do not coincide precisely with the phenomena shown in FIG. 1 at points A and E for an optoelectric sensor, then the set-point values in the set-point value memory 6 are replaced by appropriately corrected set-point values. Instead of the rotational angle VG3 between the exceeding of the threshold at A and the failure to attain the threshold at E for a certain threshold of brightness or pressure, the rotational angle VG1 between point A and the appearance of the signal maximum at M can be ascertained. This is particularly advantageous in cases where combustions that are retarded because of particular characteristics of the engine are capable of lasting until after the opening of the outlet valve.

Furthermore, instead of the rotational angle VG1, the rotational angle VG2 between the positive turning point W1 and the negative turning point W2 can be ascertained. This is advantageous whenever a steep rise in the combustion curve is additionally present, and the rotational angle VG1 thus becomes very small and hence difficult to ascertain. In these cases, too, the set-point value memory 6 must be loaded with different set-point values. These set-point values, as already mentioned above, are ascertained during the operation of a test engine. The turning points W1 and W2 are ascertained by the differentiation of the magnitude of the signal emitted by the sensor 3.

The first practical exemplary embodiment of the internal combustion engine 2 according to FIGS. 3 and 4 has at least one cylinder 18, a piston 19 movable in this cylinder 18, a cylinder head 20 mounted on the cylinder 18, at least one inlet conduit 21 passing through the cylinder head 20 and having an associated inlet valve 22, one outlet conduit 23 and one combustion chamber 24 defined by the cylinder 18, the piston 19 and the cylinder head 20. The optoelectric sensor 3 is connected to the combustion chamber 24 and is advantageously oriented such that at the earliest possible moment it recognizes an incipient flame propagation in the main combustion chamber and also observes those zones inside which the greatest brightnesses and finally the last flames appear. The sensor 3 is connected in a manner already described to the electronic circuit 4 for the purpose of attaining an adjustment as needed of the device 10 via the adjusting motor 9. The device 10 is embodied as a throttle valve pivotably supported by means of a shaft 25. In a position in which the throttle valve is oriented parallel to the course of the inlet conduit 21, it offers practically no resistance to the flow. If the throttle valve 10 is pivoted out of this position, for instance until it is oriented in the manner shown in FIG. 3, then it constricts the inside diameter of the inlet conduit 21. As a result, when the inlet valve 22 is opened and the piston 19 moves downward, a lower pressure arises downstream of the throttle valve 10 than upstream of the throttle valve 10. As a result, in the remaining inside cross section, adjacent to the throttle valve, an acceleration of the medium flowing to the combustion chamber 24 takes place. The increased speeds which are due to the acceleration cause increased turbulence in the medium, causing the combustions in the combustion chamber 24 to take place more rapidly. Depending upon the mode of operation of the engine 2, ignition can be effected in various ways, for instance by supplying the mixture through the inlet conduit 21 or by supplying air and admixing fuel with it inside the combustion chamber. Preferably, however, a fuel-air mixture is supplied and then ignited by means of ignition electrodes 26, 27. These ignition electrodes may be components of a normal spark plug 28 or be an ignition-chamber plug. Such ignition-chamber plugs are known and therefore need not be shown or described in detail herein.

The shaft 25 is aligned parallel to a piston bolt 28 inserted into the piston 19 and therefore is also parallel to a crankshaft (not shown) of the engine 2. As a result, in multi-cylinder in-line engines, several or even all the necessary throttle valves 10 can be triggered by extending the length of the shaft 25 of the adjusting motor 9.

Naturally it is also possible to use glow plugs, not shown, instead of the igniting electrodes, or even to effect the ignition solely by the heat of compression, in which case, however, the fuel should be suitably injected into the combustion chamber 24 or into an ignition chamber communicating with that chamber 24.

The second exemplary embodiment of the engine 2a according to FIG. 5 differs from the first in that no throttle element is installed in the inlet conduit 21. Instead, the inlet valve 22 is used as the means for influencing the flow. This valve 22 is triggered with a variable stroke, for instance via an adjustable hydraulic tappet 29, upon which a drive cam 30 acts. The hydraulic tappet is embodied by way of example as described in U.S. Pat. No. 4,285,310, and depending upon the adjusting pressure exerted on it, it transmits the cam stroke of the drive cam 30 either entirely or in part to the inlet valve 22. Depending upon how widely the valve 22 is opened, differing flow patterns are produced in the combustion chamber 24, as well as differing flow speeds between the inlet valve 22 and the adjoining inlet conduit 21 at that one of its ends at which it discharges into the combustion chamber 24. These different speeds and flow orientations likewise effect different, rapid progressions of the flame in the combustion chamber 24. To generate the particular adjusting pressure required, a regulator 8a is connected to the comparator 7. This regulator 8a differs from the regulator 8 described above in that instead of varying an electrical adjusting signal, it varies the adjusting pressure already mentioned. In this exemplary embodiment as well, the regulation of the curves of combustion taking place in the combustion chamber 24 is attained via the sensor 3. Signal processing can again be performed digitally, in which case the regulator 8a would be embodied as a computer operating according to an algorithm.

Instead of the throttle valve 10 serving as the means of influencing the flow and the inlet valve 22 with a variable stroke, slides of the type described in European Pat. No. 0071179 A2 can naturally also be incorporated, by way of example, in combination with the use of a spiral inlet conduit, as described in that patent, and a bypass conduit into which the slide protrudes. Optionally, pivoting valves embodied as disclosed in German Offenlegungsschrift No. 30 45 439 can also be incorporated in the apparatus.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An internal combustion engine comprising at least one combustion chamber, at least one inlet conduit leading to said combustion chamber and having an adjustable means associated with said inlet conduit for varying charge flow patterns which act inside said combustion chamber to vary the combustion flame-propagation, an adjusting motor means adjusting said adjustable means, a regulator means acting upon said adjusting motor means, a set-point value transducer and an actual-value transducer associated with said regulator means, said actual-value transducer including a sensor connected to said combustion chamber for ascertaining combustion phenomena taking place in said combustion chamber, said set-point value transducer prescribing the instants for the occurrence of said phenomena, and said regulator means controlling said adjusting motor in accordance with the outputs of aid actual value transducer and said set-point value transducer.

2. An engine as defined by claim 1, wherein said sensor comprises an optoelectric converter.

3. An engine as defined by claim 1, wherein said sensor comprises a pressure sensor.

4. An engine as defined by claim 1, wherein said sensor comprises an ion current sensor means.

5. An engine as defined by claim 2, wherein a threshold switch is connected to the output side of said sensor.

6. An engine as defined by claim 3, wherein a threshold switch is connected to the output side of said sensor.

7. An engine as defined by claim 5, wherein a differentiator circuit is connected to the output side of said sensor.

8. An engine as defined by claim 6, wherein a differentiator circuit is connected to the output side of said sensor.

9. An engine as defined by claim 4, wherein a pulse shaper circuit is connected to the output side of said sensor.

10. An engine as defined by claim 1, wherein said adjustable means serving to vary flows comprises a pivotably supported throttle valve.

11. An engine as defined by claim 1, wherein said adjustable means varying the flows comprises an inlet valve, the opening stroke of which is varied by means of said regulator means.

12. An engine as defined by claim 11, wherein a hydraulic tappet which is adjustable in length is disposed between a drive cam and said inlet valve.

13. An engine as defined by claim 1, further wherein said combustion phenomena takes place over a curve generally defined by the process of combustion in said combustion chamber.

* * * * *